(12) United States Patent
Wong et al.

(10) Patent No.: US 8,642,119 B2
(45) Date of Patent: Feb. 4, 2014

(54) METHOD AND SYSTEM FOR SHIELDING SEMICONDUCTOR DEVICES FROM LIGHT

(75) Inventors: Wingshenq Wong, Singapore (SG); David Gani, Singapore (SG); Glenn De Los Reyes, Singapore (SG)

(73) Assignee: STMicroelectronics PTE Ltd., Singapore (SG)

( * ) Notice: Subject to any disclaimer, the term of this patent is extended or adjusted under 35 U.S.C. 154(b) by 117 days.

(21) Appl. No.: 12/888,223

(22) Filed: Sep. 22, 2010

(65) Prior Publication Data

US 2012/0070145 A1    Mar. 22, 2012

(51) Int. Cl.
B05D 5/06    (2006.01)

(52) U.S. Cl.
USPC ........ 427/162; 427/256; 427/282; 427/421.1; 427/427.3; 396/439; 361/818; 348/294

(58) Field of Classification Search
USPC ........... 427/162, 421.1, 427.3, 256, 259, 272, 427/282; 396/439; 361/818; 348/294
See application file for complete search history.

(56) References Cited

U.S. PATENT DOCUMENTS

| 4,714,633 | A * | 12/1987 | Horiki et al. | 427/282 |
|---|---|---|---|---|
| 6,625,036 | B1 | 9/2003 | Horio | |
| 6,797,890 | B2 | 9/2004 | Okubora et al. | |
| 6,800,171 | B2 * | 10/2004 | Van Tyle | 427/154 |
| 7,720,374 | B2 | 5/2010 | Kim et al. | 396/275 |
| 2006/0145361 | A1 | 7/2006 | Yang et al. | |
| 2006/0208347 | A1 | 9/2006 | Kim | |
| 2007/0052827 | A1 * | 3/2007 | Hiltunen | 348/294 |
| 2008/0185603 | A1 * | 8/2008 | Itoi et al. | 257/98 |
| 2009/0134483 | A1 * | 5/2009 | Weng et al. | 257/432 |
| 2009/0184403 | A1 | 7/2009 | Wang et al. | |
| 2010/0117176 | A1 * | 5/2010 | Uekawa | 257/432 |
| 2010/0118182 | A1 * | 5/2010 | Fujii et al. | 348/374 |
| 2010/0165172 | A1 * | 7/2010 | Kawazu | 348/340 |
| 2011/0255000 | A1 * | 10/2011 | Weber et al. | 348/374 |
| 2011/0261550 | A1 | 10/2011 | Wong et al. | |

* cited by examiner

Primary Examiner — Elizabeth Burkhart
(74) Attorney, Agent, or Firm — Seed IP Law Group PLLC

(57) ABSTRACT

The present disclosure is directed to a camera module that includes at least a semiconducting die, an image-sensing circuit, a lens, a lens aperture, and a coating that adheres to an exterior surface of the camera module. The coating is opaque to light and prevents light from accessing the camera other than through the lens aperture. The opaque coating is applied as a fluid and is cured. In one embodiment, a mask material is selectively applied to exterior surfaces of the semiconducting die, electrical interconnect layers, glass layers, the lens body, or the lens aperture. After applying the opaque coating, the selectively applied mask material is removed. Methods of selectively applying a mask material include applying a conformable and peelably releasable dope-like material, placing an array of joined, selectively shaped rigid masks over an array of assemblies, and applying a conformable mask material that is heat-expandable.

23 Claims, 10 Drawing Sheets

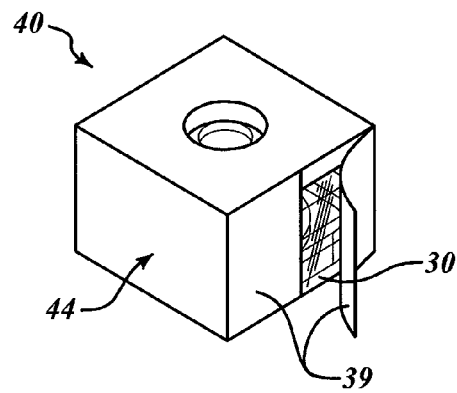
FIG.3 (Prior Art)
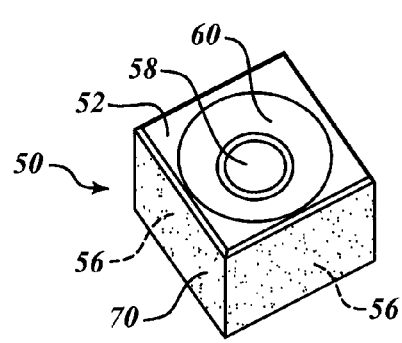 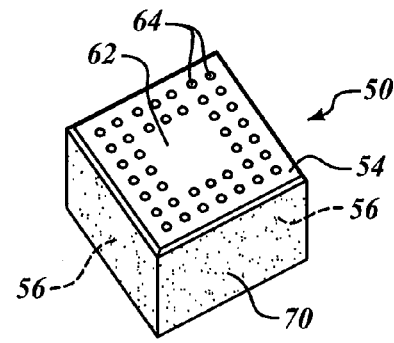
FIG.4A  FIG.4B

METHOD AND SYSTEM FOR SHIELDING SEMICONDUCTOR DEVICES FROM LIGHT

BACKGROUND

1. Technical Field

This present disclosure generally relates to light sensitive electronic devices and, in particular, to a method and system of shielding electronic devices from light.

2. Description of the Related Art

Advances in the field of semiconductor wafer-level manufacturing have enabled wafer-level processing techniques to be applied to the manufacture of optical lenses and to bump thru-silicon via (TSV) sensor technology. One application of these advances is in the manufacture of a new generation of camera modules. Although camera modules produced by these new processes have the benefit of being compact in size, many do not effectively prevent stray light from entering the camera lens. Stray light that enters the camera modules through sidewalls negatively impacts image quality. Techniques exist in the art for preventing stray light from entering the camera module, however each has the negative consequences of raising the cost of the camera module or increasing the overall size of the camera module, or both.

For example, FIGS. 1A and 1B show a known plastic molded lens housing 10 configured to be arranged over a sensor module (not shown). The molded lens housing 10 includes a lens stack 12 that extends from an opening 18 in a back surface 20 to an opening 22 in a front surface 24. The opening 22 in the front surface 24 allows an image to be sensed by the sensor module when assembled with the housing 10. The sensor module may be on a rectangular substrate that is configured to fit within the opening 18. The molded lens housing 10 is thick black plastic that absorbs light and acts as the primary light shield of the camera module. A thickness 14 of walls 16 increases the overall size of final camera module and is limited by manufacturing constraints of molded plastic. The molded lens housing 10 is manufactured separately and then attached to the sensor module in a subsequent step. Additionally, if the molded lens housing 10 is used with a TSV die, careful design is required to ensure that the molded lens housing 10 fully covers the TSV die to prevent stray light from entering the camera module at an edge.

FIG. 2 is a cross-sectional view of a camera module 26 having a thin metal shield can 28 positioned on top and side surfaces 36 and 38. The camera module 26 includes an optical lens 27 having semi-transparent sidewalls 29. The camera module 26 is formed on a top surface 31 of a TSV die 30 that extends wider than the semi-transparent sidewalls 29. The shield can 28 is manufactured as a separate component from the optical lens 27 and attached with glue 32 on the top surface 36. The camera module 26 is then heated in an oven to cure the glue 32 and secure the shield can 28 on the camera module 26.

The shield can 28 extends down to a bottom surface 33 of the TSV 30 to seal the camera module 26 and optical lens 27 from light. Misalignment of the shield can 28 can allow light into the camera module 27. Also, an air gap 34 extends between side surfaces 38 of the semi-transparent sidewalls 29 and the shield can 28. The shield can 28 can be 100 microns in thickness, which with the air gap 34 makes the overall device larger in size. The shield can 28 increases a width of the camera module 26 by more than 0.5 millimeters. The manufacturing and assembly of the shield can 28 are expensive and increase the camera module's overall size.

FIG. 3 is a known camera module 40 that uses precut sheets of high-temperature black paper 39 adhered to outer walls 44 of the camera module 40. The black paper 39 is coated with a high-temperature adhesive on one side that securely attached the paper 39 to the outer walls 44. The walls 44 of the camera module 40 are substantially similar in width to the TSV die 30. If there are variations between the width of the walls and the die 30, the paper 39 is difficult to align accurately, which complicates automating the method. The paper 39 is also unreliable in its adhesion to the sides of the camera module. The paper is easily scratched, which allows stray light to interfere with the lens. Accordingly, this method is expensive to implement and cycle times are higher than for other light shielding assemblies.

BRIEF SUMMARY

According to one embodiment of the present disclosure, an apparatus includes a semiconducting die having an image-sensing circuit, a die interface layer, an electrical interconnect layer, a glass layer, a lens body, a lens aperture, and an ink coating. The lens body is on a first surface of the semiconducting die and the die interface layer lies on a second surface, opposite to the first surface, of the semiconducting die. The electrical interconnect layer electrically couples to the image-sensing circuit through the die interface layer. The lens body is on the glass layer and has an aperture on an end away from the glass layer through which the lens body receives an image. An ink coating adheres to sidewalls of the lens body and the glass layer to prevent stray light from entering the lens body.

In one embodiment, prior to applying the ink coating a mask material is selectively applied to an exterior surface (i.e., the interface layer, the electrical interconnect layer, the glass layer, the lens body, the lens aperture, or to more than one). The mask material is configured to be removable after application of the ink. For example, the mask material may be placed over the lens aperture to prevent ink from coating the lens aperture. The die interface layer would be protected because it would be facing a surface or carrier on which the apparatus was positioned. The ink is an opaque coating in liquid or aerosol form that is applied to all exposed surfaces of the apparatus. The ink coating can be cured and then the selectively applied mask material can be removed.

In one embodiment selectively applying a mask material includes applying a conformable and peelably releasable putty-like material. In another embodiment, the selectively applying a mask material includes placing an array of joined, selectively shaped rigid masks over an array of the apparatuses. In yet another embodiment, the selectively applying a mask material includes applying a conformable mask material that is heat-expandable.

According to another embodiment of the disclosure, a color-contrasted electronic package includes a semiconductor die, an encapsulation material, an electromagnetic interference (EMI) shield layer, a selectively colored ink, and a marking material. The encapsulation material surrounds the semiconductor die on at least several sides. The EMI shield layer adheres to an exterior surface of either the semiconductor die or the encapsulation material, or both. The selectively colored ink adheres to the exterior surface of the EMI shield layer, and the marking material lies on the selectively colored ink. In one embodiment the marking material and the selectively colored ink have contrasting colors. In another embodiment, a portion of the adhered selectively colored ink is removed from the exterior surface of the EMI shield layer, the selectively colored ink and the EMI shield layer having contrasting colors.

The black ink coated light shield has the advantages of maintaining the size of the apparatus or module to which the shield is providing protection, adding little to the overall cost of the apparatus or module, and in production is a scalable process that does not affect the cycle time or production rates of apparatus or modules to which the light shield is applied.

BRIEF DESCRIPTION OF THE SEVERAL VIEWS OF THE DRAWINGS

FIG. 3 shows an isometric view of a camera module with a precut black paper light shield on exterior walls.

FIG. 4A shows a top isometric view of a camera module having a coated light shield in accordance with one embodiment of the present disclosure.

FIG. 4B shows a bottom isometric view of a camera module having a coated light shield in accordance with one embodiment of the present disclosure.

DETAILED DESCRIPTION

Figure 1A:
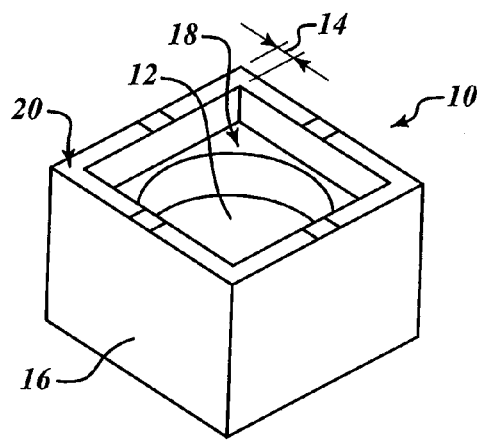
FIG. 1A shows a bottom isometric view of a known molded lens housing for shielding a camera module from light.
Figure 1B:
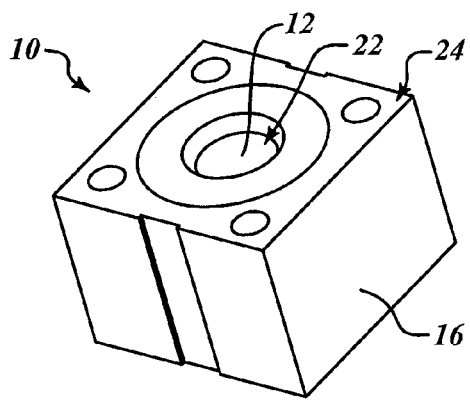
FIG. 1B shows a top isometric view of the known molded lens housing of FIG. 1A.
Figure 2:
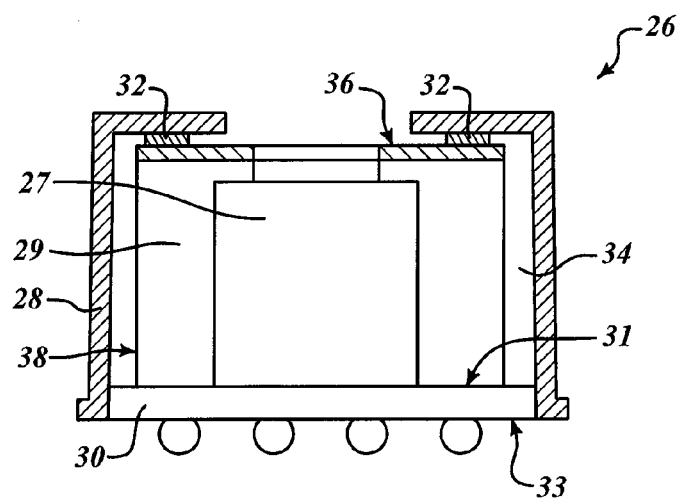
FIG. 2 shows a partial cross-sectional view of a known shield can over a camera module.

FIGS. 4A and 4B are top and bottom isometric views, respectively, of a camera module 50 in accordance with an embodiment of the present disclosure. The camera module 50 includes top and bottom surfaces 52, 54 and sidewalls 56. Within the camera module 50 is a lens 58 evident through a lens aperture 60 in the top surface 52. The lens 58 is placed on a stack of a plurality of layers 80 of semi-transparent material, see FIG. 5. The stack of layers 80 are positioned on a TSV glass layer (not shown in FIGS. 4A-4B) positioned on a top surface of a substrate 62 that includes an electronic sensor (not shown). The substrate 62 may be a silicon wafer. The sensor in the substrate 62 is optically coupled through the TSV glass layer to the lens 58 and is configured to process images received through the lens. The substrate 62 also has a bottom surface that is the bottom surface 54 of the camera module 50 in one embodiment.

The camera module 50 also has a plurality of solder balls 64 arranged in a ball grid array on the bottom surface 54 of the camera module 50. The plurality of solder balls 64 are electrically connected to contacts of the sensor positioned in the substrate 62. The ball grid array provides an electrical connection between the camera module 50 and a circuit board of an electronic device, such as a cell phone, a digital camera, or laptop. Other forms of electrical interconnection between the sensor and the circuit board may be used.

The sidewalls 56 are formed of semi-transparent material that would allow light into the camera module 50 if they were not covered. In order to prevent unwanted light from being detected by the sensor, the sidewalls are coated with ink 70. The ink 70 is a dark color, such as black, that absorbs all frequencies of light, thereby allowing no light to enter the camera module. In one embodiment, the ink 70 is a high temperature epoxy-type black ink, although those skilled in the art will understand that various other inks could be employed to shield light from passing through the sidewalls 56. The ink 70 coats the sidewalls 56 of the camera module, but does not coat the top and bottom surfaces 52, 54 of the camera module 50. By selecting only the sidewalls 56 for coverage, the ink 70 coated to be shield light does not interfere with the lens 58 or with the substrate 62. Selective coating of the ink 70 on the camera module 50 is accomplished using masking, as will be discussed below. Embodiments having various arrangements of the dark ink on various surfaces of the camera module are all considered within the scope of the present disclosure.

Figure 5:
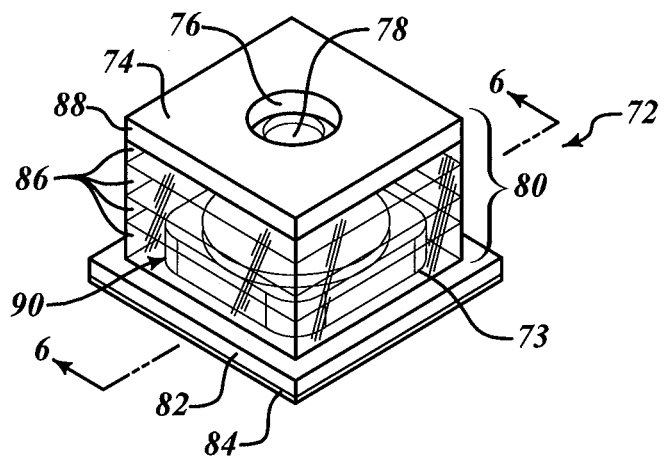
FIG. 5 is an isometric view a camera module prior to coating in accordance with one embodiment of the disclosure.

FIG. 5 is a three-dimensional view of a camera module 72 prior to being coated with the ink 70. The camera module 72 includes a lens body 73 with a top surface 74 having a lens aperture 76. The camera module also includes an optical lens 78 formed within the lens body 73 and underlying the lens aperture. The lens body 73 includes a plurality 80 of layers formed on a TSV glass layer 82 on a semiconductor die 84. The plurality 80 of layers includes a stack of semi-transparent material layers 86 formed using semiconductor processing techniques to surround the optical lens 78. A top layer or baffle 88 of the plurality 80 of layers is an opaque material through which the lens aperture 76 extends. The opaque baffle 88 prevents unwanted light from entering the optical lens 78 through the top of the camera module, other than through the lens aperture 76. The opaque baffle 88 is simple to form on the top of the camera module 72 and works with the ink 70 to be formed as a light shield on sidewalls 90 of the optical lens 78.

Figure 6:
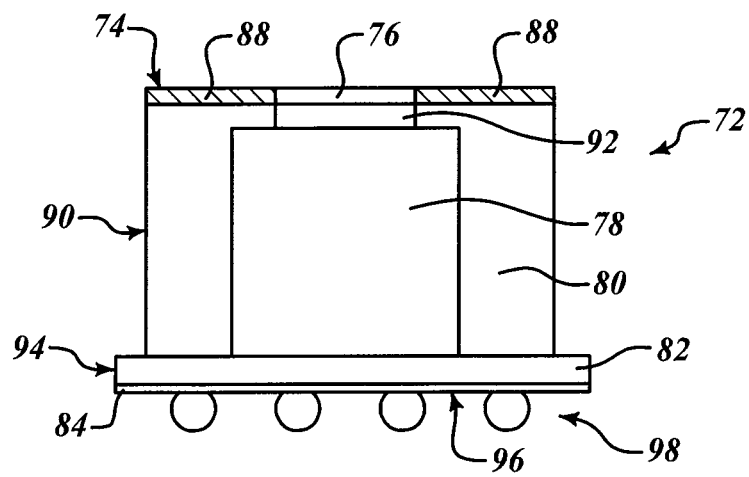
FIG. 6 is a simplified cross-sectional view of the camera module taken through 6-6 of FIG. 5 in accordance with one embodiment of the disclosure.

FIG. 6 is a simplified cross-sectional view of the camera module 72 of FIG. 5 taken through 6-6. The optical lens 78 is formed within the plurality of layers 80, which include the semi-transparent layers 86 (see FIG. 5) and the top opaque layer 88. The lens aperture 76 is formed through the opaque layer 88 to allow light into the optical lens 78. A focus member 92 may be included to direct the light into the optical lens 78. The camera module 72 includes the TSV glass layer 82 on the die 84. The sidewalls 90 of the plurality of layers 80 do not extend to an edge 94 of the TSV glass layer 82. However, in alternative embodiments, especially where a second surface 96 is positioned upward during application of the ink 70, the sidewalls 90 may extend to the edge 94.

A ball grid array 98 is formed on the second surface 96 of the die 84. The ball grid array 98 provides electrical connection from contacts on the die 84 to the electronic device in which the camera module 72 will be installed.

Figure 7A:
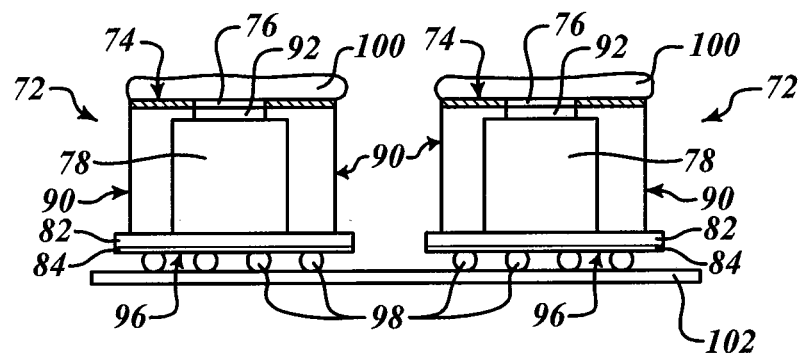
FIG. 7A is a simplified cross-sectional view of a camera module having a peelable masking material on a first surface in accordance an embodiment of the present disclosure.
Figure 7B:
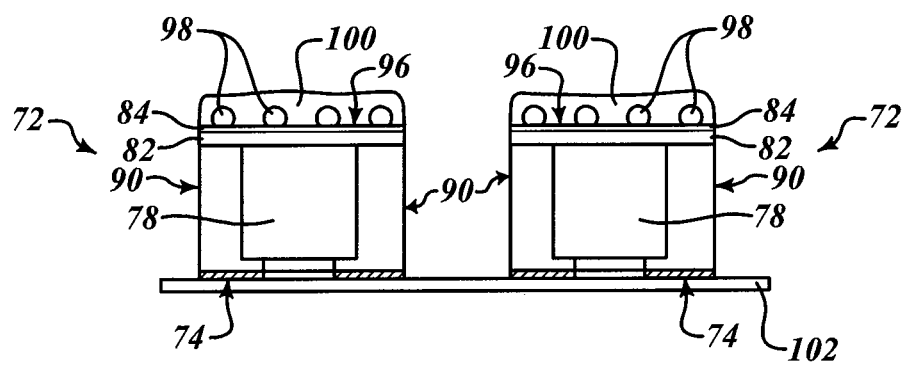
FIG. 7B is a simplified cross-sectional view of a camera module having a peelable masking material on a second surface in accordance with an embodiment of the present disclosure.

FIGS. 7A and 7B are alternative methods of coating a pair of the camera modules 72 with ink 70 to form a thin light shield. In one embodiment of the method, the first or second surfaces 74 and 96, respectively of the camera modules 72 are covered with a masking material 100. In FIG. 7A, the masking material 100 shields the lens 78, the lens aperture 76, and the first surface 74 from the ink 70 as it is applied to the sidewalls 90 of the optical lens 78. The ink 70 will also coat exposed portions of the TSV glass layer 82 and the die 84, which may include a top surface of the TSV glass layer 82 and side surfaces of the TSV glass layer and the die. The sidewalls 90 of the optical lens 78 and the side surfaces of the TSV glass layer 82 and the die 84 form exterior walls of the camera module 72. As in FIG. 7B, the ball grid array 98 is shielded from the black ink 70 coating applied during the method of forming the thin light shield. In other embodiments of the method, alternative surfaces or regions of surfaces of the camera module 72, or other kinds of electronic modules, are masked. All of these embodiments are considered within the scope of the disclosure. Methods of coating the sidewalls 90 will be described in more detail below.

In FIG. 7A, the camera modules 72 are positioned on a carrier 102 with the second surface 96 facing the carrier. The modules 72 are spaced from each other by a distance that allows the ink 70 to sufficiently coat the sidewalls 90. The carrier 102 acts as a support or stiffener to transport the camera modules 72 as they are covered with ink 70. As described above with respect to FIG. 6, the TSV glass layer 82 and die 84 are wider than the optical lens 78 and the sidewalls 90. In FIG. 7B, the camera modules 72 are positioned on the carrier 102 with the first surface 74 facing the carrier. Also, the TSV glass layer 82 and the die 84 are as wide as the sidewalls 90 of the optical lens 78. When the first surface 74 is facing the carrier 102, the TSV glass layer 82 and the die 84 are equal to or smaller than the sidewalls 90 of the optical lens so that the TSV glass layer 82 and the die 84 do not interfere with the application of the ink 70. Forming the TSV glass layer 82 and the die 84 to be at most as wide as the sidewalls 90 ensures that all of the sidewalls 90 are fully coated with ink 70.

In both FIGS. 7A and 7B, the masking material 100 is a peelable, pliable, putty-like material that is applied by hand or machine over the first or second surface 74, 96 of the camera module 72. Due to the putty-like consistency of the material, the peelable masking material 100 can be applied to the first and second surfaces 74, 96 at a thickness sufficient to cover vertical features, such as the ball grid array 98, and uneven surfaces such as the lens aperture 76. Conversely, if the surface being covered is smooth, the peelable masking material 100 can be made thin. The peelable masking material 100 is configured to be easily released from the first and second surfaces 74, 96 without leaving residue after the peelable masking material 100 is removed.

Figure 8A:
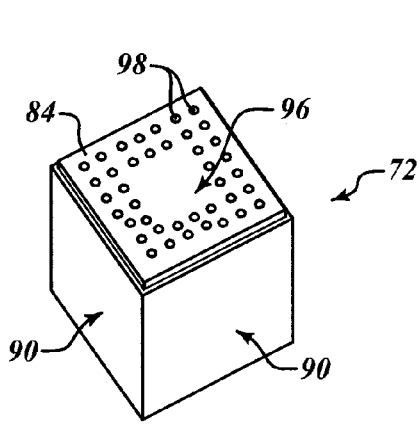
FIGS. 8A and 8B show perspective views of a camera module without and with a metal mask, respectively, in accordance with one step of a method of one embodiment of the present disclosure.
Figure 8B:
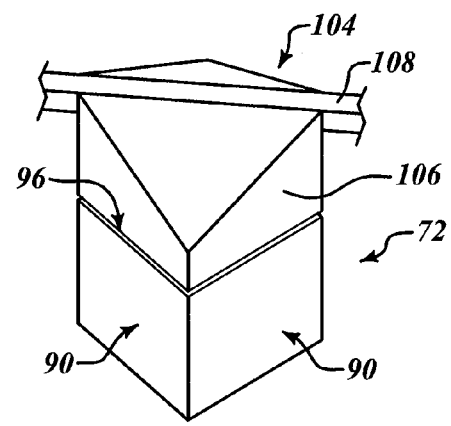
Figure 8C:
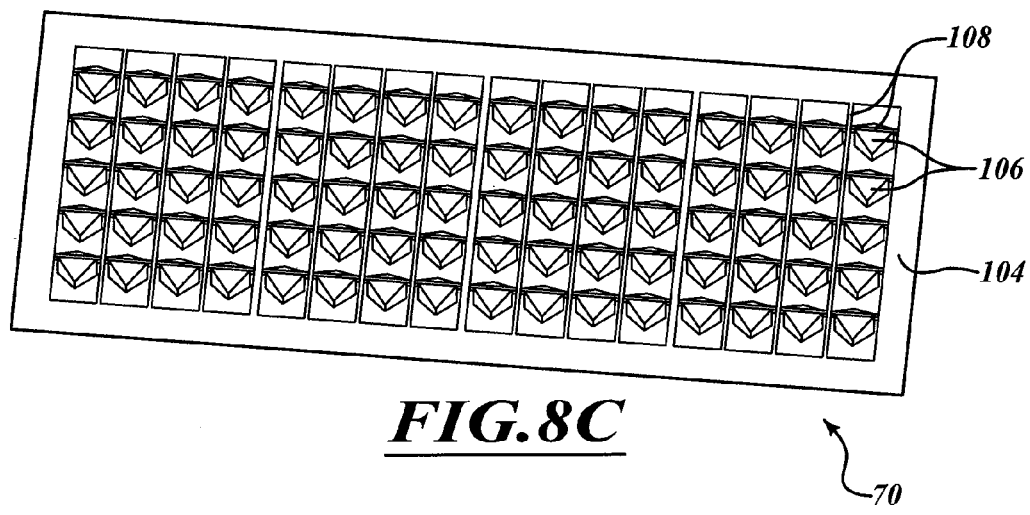
FIG. 8C is a metal mask having an array of heads in accordance with an embodiment of the present disclosure.

In an alternate embodiment for masking shown in FIGS. 8A-8C, the first or second surface 74, 96 of the camera module 72 is covered by a reusable metal mask 104. In FIG. 8A, the camera module 72 is positioned so that the second surface 96 having the ball grid array 98 is exposed. The die 84 is not as wide as the sidewalls 90. This allows all the sidewalls 90 to be coated with the ink 70. FIG. 8B the camera module 72 having the second surface 96 covered by a head 106 of the metal mask 104. The head 106 is attached to a frame 108 and is configured to cover the entire second surface 96 of the camera module 72.

In FIG. 8C, the metal mask 104 has an array of heads 106 attached to the frame 108 of the metal mask 104. The array of heads 106 are fixed at regular intervals in the metal mask 104 by the frame 108. The array of heads 106 in FIG. 8C includes 4 subarrays of five by four heads. The array has the heads 106 positioned in a diamond arrangement, although other suitable positions are also acceptable. Accordingly, eighty camera modules 72 could be coated with ink 70 simultaneously. The camera modules may be positioned on the carrier 102 so that the metal mask 104 can be positioned over the second surface 96 of the camera modules 72. The array of heads 106 is placed over the plurality of the camera modules 72, so that each head 106 coincides with the first or second surface 74 or 96 of the camera module 72 to be masked. Once the camera modules are coated with ink 70, the mask 104 is easily removed from all of the camera modules simultaneously.

Figure 9:
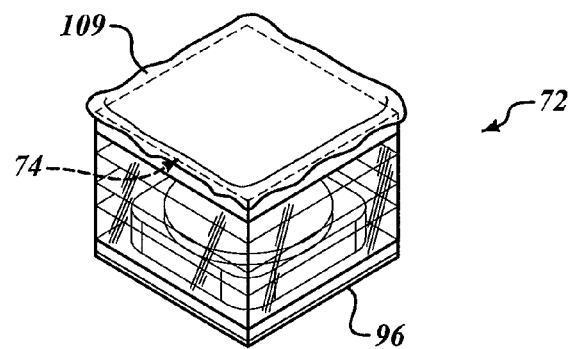
FIG. 9 shows an isometric view of a heat-expandable mask on a camera module in accordance with an embodiment of the present disclosure.

In FIG. 9, in yet another embodiment for masking the camera module 72, the top surface 74 of the camera module 72 is masked by a heat-expandable mask 109. Of course, the mask 109 could also be employed to mask the bottom surface 96 of the camera module 72. The heat expandable mask 109 is composed of a pliable putty-like thermally responsive material that is applied by hand or machine over the top surface of the camera module 72. Due to the putty-like consistency of the material, the heat-expandable mask 109 can be applied to surfaces at a thickness sufficient to cover vertical features, such the ball grid array 98, and uneven surfaces, such as the top surface 74 with the lens aperture 76. In one embodiment, the heat-expandable masking material 109 is in the range of 5 and 500 microns in thickness. If the surface to be covered is smooth, the heat-expandable mask 109 can be made thin. The material of the heat-expandable mask 109 has the quality of expanding under elevated temperatures, such as between 50 and 200 degrees Celsius, to ease release of the heat-expandable mask 109 from the surface of the camera module 72.

Figure 10A:
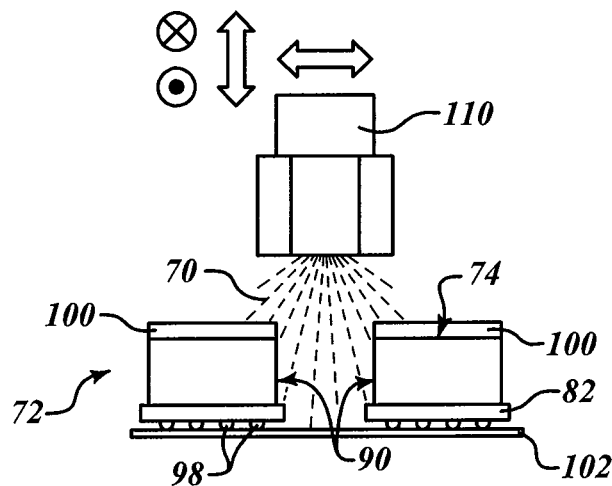
FIGS. 10A, 10B are schematic views of a process of applying a light shield to a plurality of camera modules in accordance with one embodiment of the present disclosure.
Figure 10B:
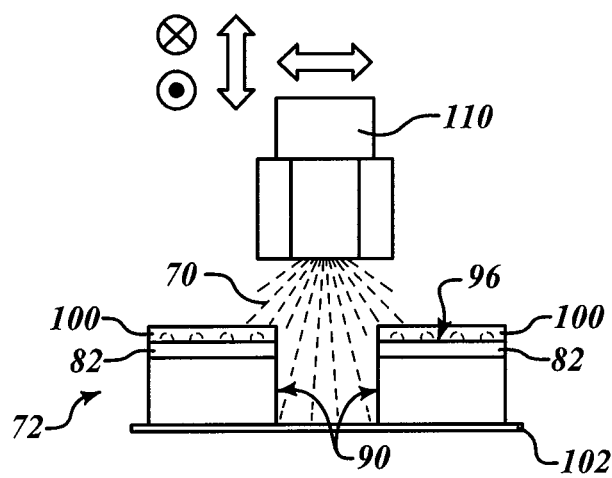

FIGS. 10A and 10B show a part of the method of applying ink to coat a plurality of camera modules 72. In FIG. 10A, the first surfaces 74 of the camera modules 72 are covered with the masking material 100 as the ball grid arrays 98 rest on the carrier 102. A spray gun 110 is positioned above the carrier 102 and the camera modules 72 and is configured to spray a high-temperature resistant epoxy based black ink 70 to coat the sidewalls 90 and the exposed portions of the TSV glass layer 82. The ink 70 may be an atomized spray from the spray gun 110. The ink 70 is coated to be in a thickness in the range of 5 to 200 microns. The ink 70 is also configured to withstand the temperatures reaches for solder reflow.

The spray gun 110 is configured to move in three dimensions, i.e., a height of the spray gun 110 from the masking material 100 can be adjusted and the spray gun 110 can move forward, backward, left, and right over the camera modules 72 to achieve even coverage of the sidewalls 90 of the plurality of camera modules 72. The spray gun 110 may be configured to move along other angles in a variety of directions. A rate at which the ink 70 is expelled from the spray gun 110 can be adjusted. A viscosity of the ink 70 is selected to sufficiently coat the sidewalls 90 of the camera modules 72 while avoiding spotty or uneven coverage.

In FIG. 10B, the second surface 96 of the camera module 72 is covered with the masking material 100. The TSV glass layer 82 and the die 84 (not shown) are as wide as the sidewalls 90. This equal width allows the ink 70 to coat the portions of the sidewalls 90 adjacent the TSV glass layer 82. In FIGS. 10A and 10B, the peelable masking material 100 is used, but the metal mask 104, the heat-expandable mask 109, or other suitable masking materials are also within the scope of the disclosure.

Figure 11:
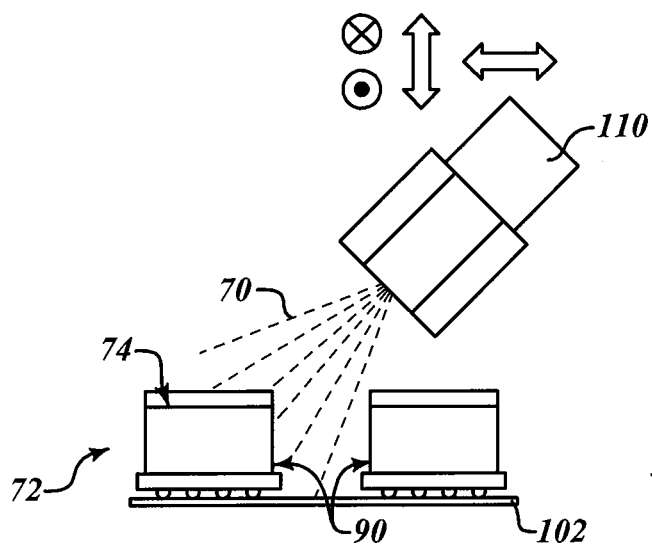
FIG. 11 is an alternative process of applying a light shield to a plurality of camera modules, in accordance with another embodiment of the present disclosure.

FIG. 11 is a alternative embodiment of the spray gun 110 configured to apply ink 70 with the spray gun 110 inclined at an angle. In one embodiment, the spray gun 110 is angled between 20 degrees and 70 degrees with respect to the top surface 74 of the camera module 72. The inclined spraying can coat the sidewalls 90 of the camera module 72 are more evenly. In order to fully coat the sidewalls 90, the spray gun's 110 angle can be adjusted throughout the process.

Figure 12A:
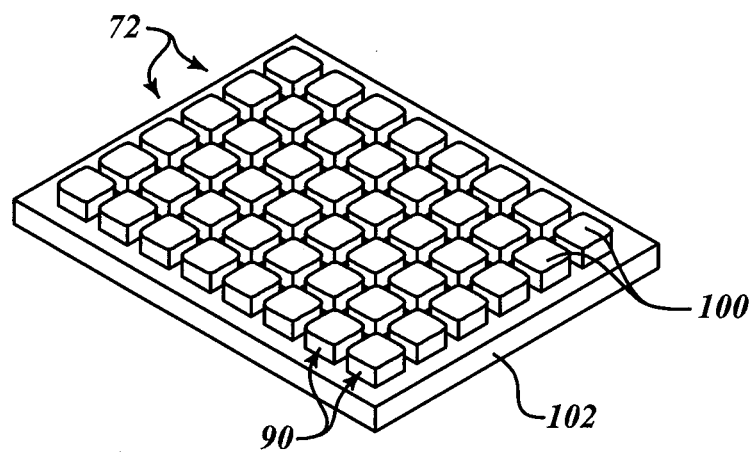
FIGS. 12A and 12B show isometric views an array of camera modules before and after coating with a black ink, respectively, in accordance with one embodiment of the present disclosure.

FIG. 12A is a simplified three-dimensional view of a plurality of camera modules 72 on the carrier 102, positioned to be coated with ink 70 in bulk. The masking material 100 may be formed on the camera modules 72 by an automated distribution process. The first or second surface of the camera module is exposed and then covered with the masking material 100. The carrier 102 is placed in an ink spraying chamber where the spray gun 110 passes over each of the camera modules to spray ink 70 on the sidewalls 90. After the camera modules 72 are coated with ink 70, the carrier 102 may be placed in an oven to cure the ink 70.

Figure 12B:
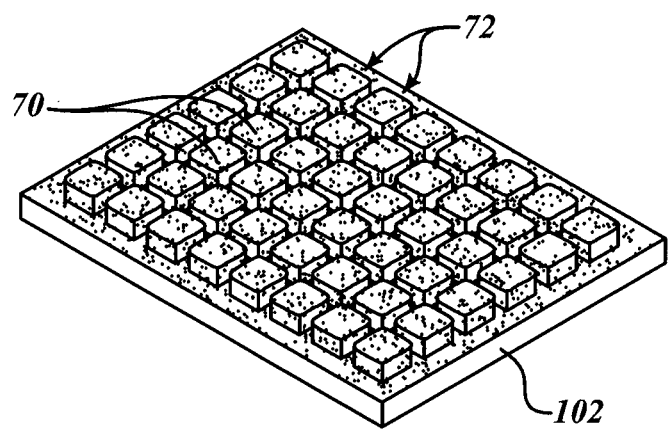

FIG. 12B are the plurality of camera modules 72 after the ink 70 has been applied and cured. The ink 70 coats all exposed surfaces. Subsequently, the masking material 100 is removed from the first or second surface of the camera modules 72. The ink 70 is a dark color that prevents light from interacting with the lens 78 through the plurality of transparent layers 80. Accordingly, the camera modules 72 have a very thin light shield that does not appreciably increase the size of the camera module.

Figure 13:
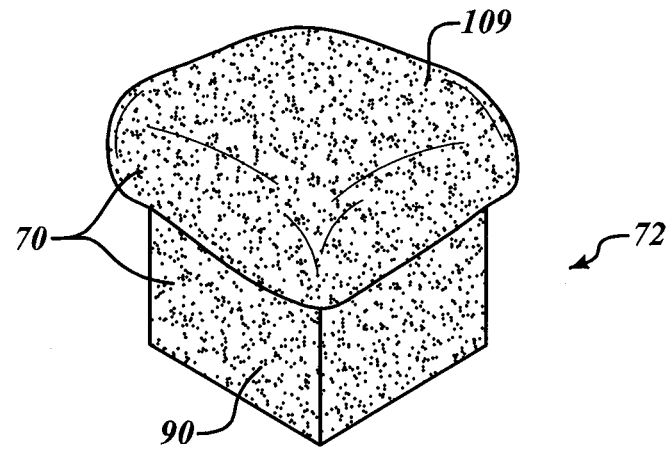
FIG. 13 shows an isometric view of a masked camera module after coating with black ink in accordance with yet another embodiment of the present disclosure.

In FIG. 13, the heat-expandable mask 109 is used, which increases in size as the ink 70 is cured. The heat-expandable mask 109 expands under elevated temperature during curing, which causes the mask 109 to separate from the camera module 72 as it expands. The expansion of the heat-expandable masking material 109 eases the removal of the masking material from the camera module 72.

Figure 14:
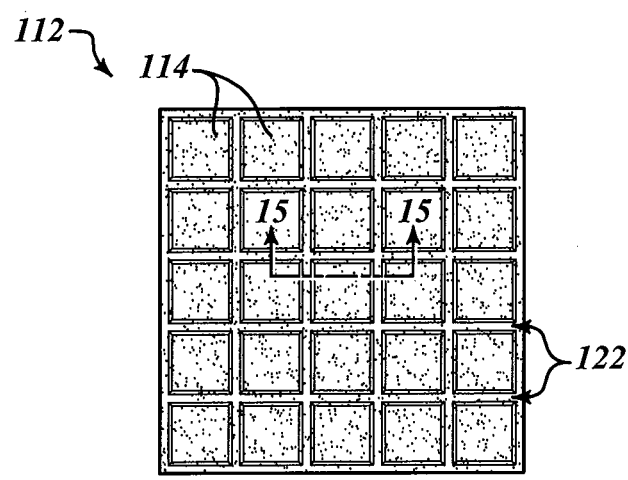
FIG. 14 is a top down view of an electronic module array having an electromagnetic interference shield layer in accordance with one embodiment of the disclosure.

FIG. 14 is a top down view of an electronic module array 112 having an electromagnetic interference shield formed according to another embodiment of the present disclosure. A plurality of electronic modules 114 are positioned at intervals in the array 112. Each electronic module 114 includes a die 116 that is coupled to a ball grid array 118 and covered with a molding compound 120, see FIG. 15. The electronic module may be have an embedded wafer level ball grid array. A groove 122 separates adjacent electronic modules 114. In an alternative embodiment, the electronic module array 112 may be a plurality of camera modules 72 as described above. The electronic module array 112 may be coated with ink 70.

Figure 15:
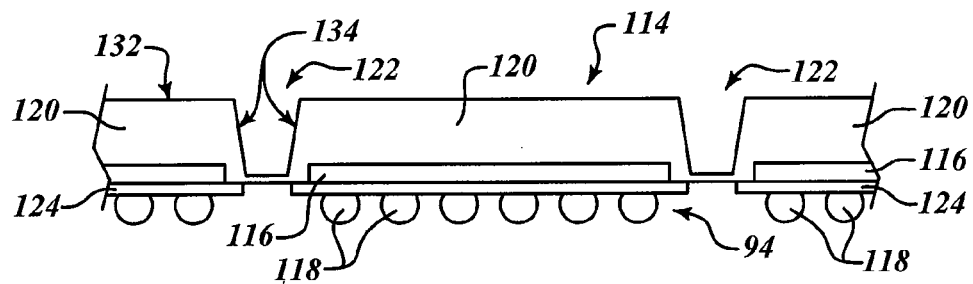
FIG. 15 shows a side, cut-away view of the electronic module array taken along 15-15 of FIG. 14 prior to coating with an electromagnetic interference shield.

FIG. 15 is a cross-sectional view of the array 112 of electronic modules 114 taken through 15-15 of FIG. 14. Each electronic module has the die 116 positioned on a frame or substrate 124 onto which solder balls of the ball grid array 118 are coupled. Each die 116 is covered with the molding compound 120 and separated from an adjacent die 116 by molding compound 120 and the groove 122. After processing, a laser, saw, or water jet cutting device will singulate the electronic modules 114 by cutting through the groove 122. The molding compound 120 may be covered in ink if stray light is a concern.

Figure 16:
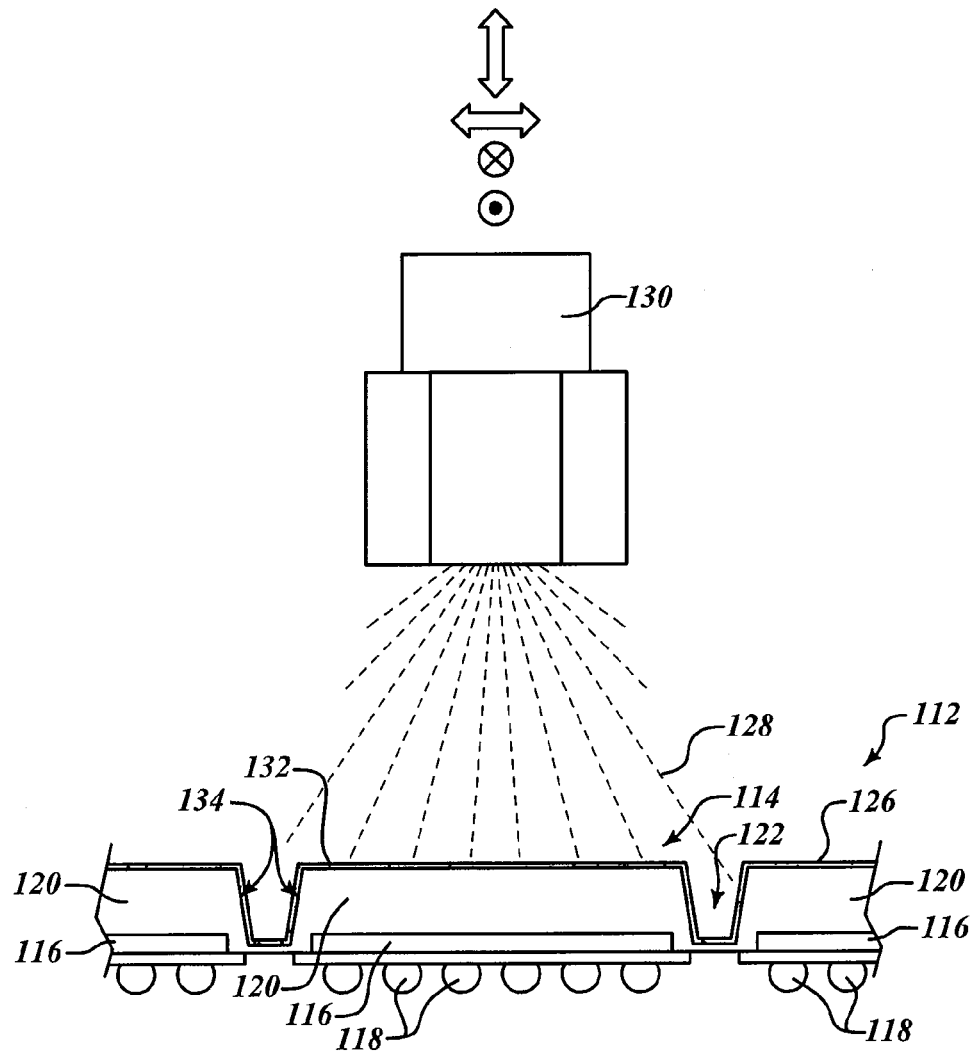
FIG. 16 shows a schematic view of the electronic module of FIG. 15 being coated with an electromagnetic interference shield.

FIG. 16 is the array 112 of electronic modules 114 being coated with an electromagnetic interference shield 126. A conductive paint 128 is sprayed from a spray gun 130 to evenly coat a top 132 and sidewalls 134 of the electronic modules 114. The conductive paint 128 is reflective and in one embodiment includes silver particles, which makes subsequent marking of the electronic module 114 difficult. There is less contrast of the marking on reflective conductive paint 128. Accordingly, the array 112 of electronic modules 114 having the conductive electromagnetic interference shield 126 can be covered with the ink 70 described above with respect to the camera modules. The ink 70 provides a surface that allows for more contrast when marking.

Figure 17:
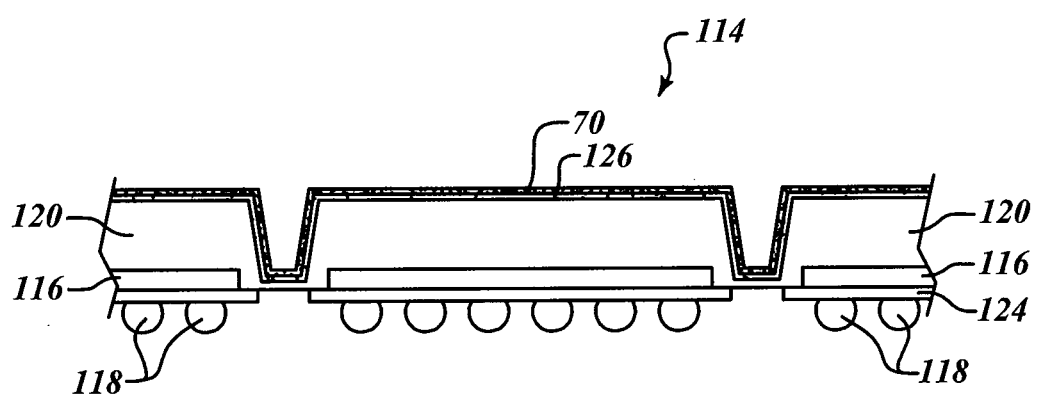
FIG. 17 is a side view of an array of electronic modules after coating with black ink in accordance with one embodiment of the present disclosure.

FIG. 17 shows the electronic modules 114 having the electromagnetic interference shield 126 covered with the ink 70. The ink 70 may be applied as described above with respect to FIGS. 10A, 10B, and 11. The ink 70 may also be cured with heat. By adding the layer of ink 70, good marking contrast can be achieved. In one embodiment, the ink layer 70 is etched, such as by a chemical etch, to remove the black ink in a pattern of the letters or numbers to be formed. Due to the color contrast between the brightly colored electromagnetic interference shield layer 126 and the ink 70, removal of portions of the ink causes the marking characters to be prominently visible on the top surface 132 of the electronic module 114.

In another embodiment, the marking characters are scribed into the ink 70 by using a laser to remove the ink. The laser removes portions of the ink to reveal the electromagnetic interference shield layer 126 underneath the ink 70. The revealed electromagnetic interference shield layer 126 contrasts with the dark ink to make the marked characters distinct to the human eye. The electromagnetic interference shield is a silver or gray color, in a strong contrast to the black ink. In another embodiment, the marking characters are placed over the ink 70 using a marking ink having a color that contrasts with the color of the dark ink 70.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   placing a first surface of a module on a carrier, the first surface including an opening for a lens aperture;
   masking a second surface of a module with a masking material, the second surface including a plurality of external electrical connectors, the module having a plurality of sidewalls transverse to the second surface;
   forming the masking material to be coplanar with the sidewalls of the module;
   spraying an opaque ink onto the module with a spraying device, the ink being configured to prevent light from passing through the sidewalls;
   curing the ink by heating the module; and removing the masking material from the second surface of the module.

2. The method of claim 1 wherein the masking material is a peelable mask.

3. The method of claim 1 wherein the masking material is a heat expanding material.

4. The method of claim 3 wherein the heat expanding material expands when heated in the range of 50 and 200 degrees Celsius.

5. The method of claim 1 wherein the masking material is a reusable metal head.

6. The method of claim 1, further comprising forming an electromagnetic interference shield on the sidewalls of the module prior to coating the sidewalls with the ink.

7. The method of claim 6 wherein forming the electromagnetic interference shield includes applying a conductive paint to the sidewalls.

8. A method, comprising:
   forming a first opaque layer on a planar top surface of a lens body, the top surface having an opening positioned above a lens, the lens body having a plurality of sidewalls transverse to the top surface;
   attaching a substrate to a bottom surface of the lens body, the substrate including external electrical contact regions on an opposite side of the substrate with respect to the lens body, the substrate having a plurality of sidewalls;
   selectively applying a mask material to the top surface of the lens body, the mask material covering the opening;
   covering the sidewalls of the lens body and of the substrate with a second opaque layer, the covering including:
      spraying an opaque ink on the plurality of sidewalls of the lens body and the substrate using a spraying device;
      adjusting an angle of the spraying device during the spraying; and
      curing the opaque ink; and
   removing the mask material.

9. The method of claim 8 wherein selectively applying the mask material comprises applying a conformable and peelable material.

10. The method of claim 8 wherein selectively applying the mask material comprises placing an array of joined, selectively shaped rigid masks over the top surfaces of an array of the lens bodies.

11. The method of claim 8 wherein selectively applying the mask material comprises applying a conformable mask material that is heat-expandable.

12. The method of claim 8 wherein spraying the opaque ink includes orthogonal and angled atomized-type spraying.

13. The method of claim 12 wherein spraying the opaque ink includes moving the spraying device along more than one axis of motion.

14. The method of claim 12 wherein the angled atomized-type spraying occurs at an angle of between 20 and 70 degrees to the top surface of the lens body.

15. The method of claim 8, further comprising forming an electromagnetic interference shield on the sidewalls of the module prior to spraying the ink.

16. The method of claim 15 wherein forming the shield includes applying a conductive coating to the sidewalls.

17. The method of claim 8 wherein the sidewalls of the substrate are not coplanar with the sidewalls of the lens body.

18. The method of claim 8 wherein the sidewalls of the substrate are coplanar with the sidewalls of the lens body.

19. The method of claim 8 wherein the adjusting the angle of the spraying device during the spraying includes continually adjusting the angle.

20. A method, comprising:
   forming a first opaque layer on a planar top surface of a plurality of modules, the top surface having an opening positioned above a lens, the modules having a plurality of sidewalls transverse to the top surface;
   attaching a substrate to a bottom surface of each of the modules, the substrate including external electrical contact regions on an opposite side of the substrate with respect to the modules, the substrate having a plurality of sidewalls;
   covering the entire top surface of each of the plurality of modules with a mask, the mask being coupled to a frame, the frame having the plurality of masks arranged in an array;
   applying a second opaque layer to sidewalls of the plurality of modules and to the sidewalls of the substrates; and
   removing the masks.

21. The method of claim 20, further comprising applying an electromagnetic interference shield to the sidewalls of the modules prior to applying the second opaque layer to the sidewalls.

22. The method of claim 20 wherein the frame and the mask include metal.

23. The method of claim 20 wherein applying the second opaque layer includes spraying the second opaque layer using a spraying device and adjusting an angle of the spraying device during the spraying.

* * * * *